P. T. SULLIVAN & F. JUDGE.
PIPE THREADING AND REAMING DEVICE.
APPLICATION FILED DEC. 26, 1913.
1,096,809.  Patented May 12, 1914.
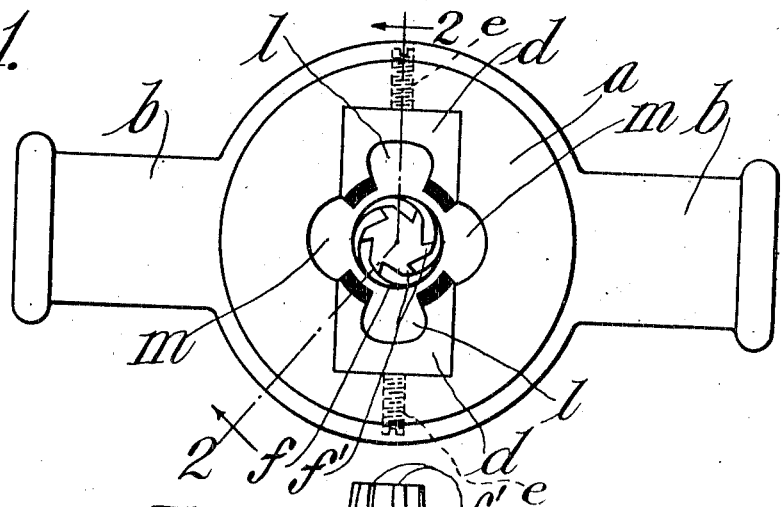
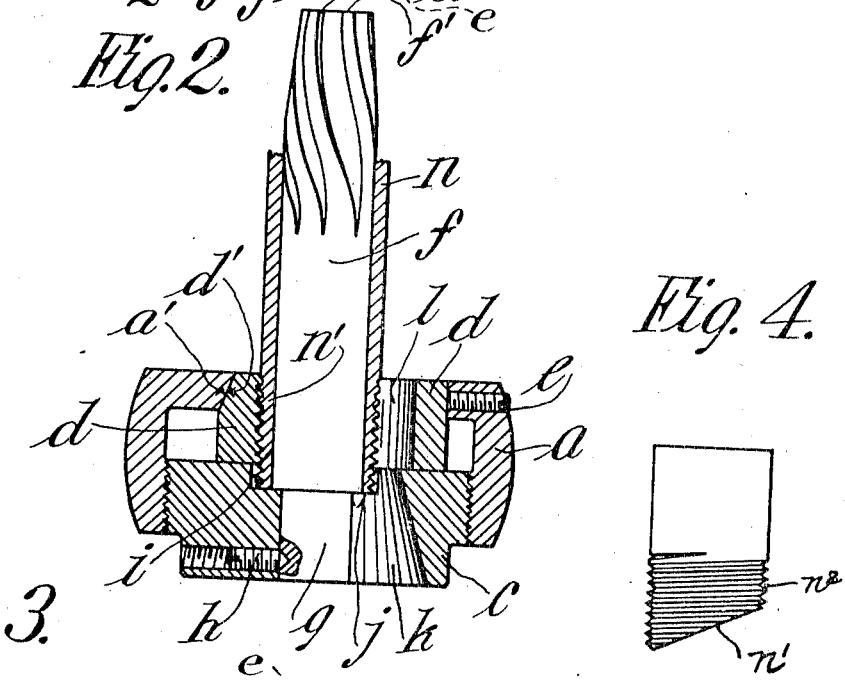
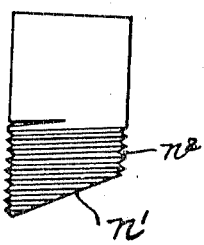
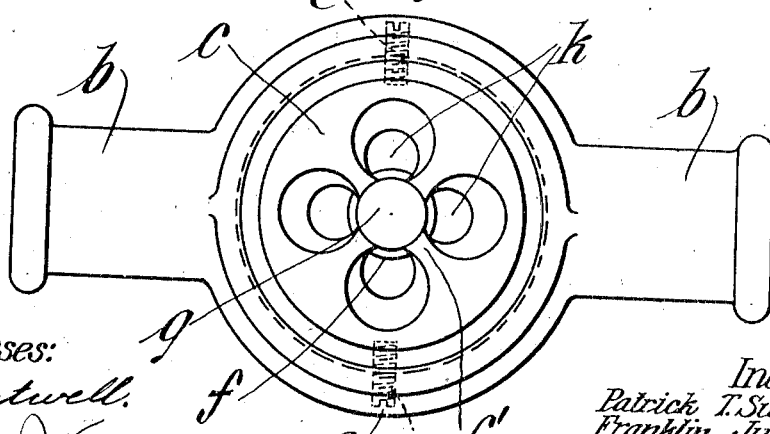
Witnesses:
Inventors.
Patrick T. Sullivan and
Franklin Judge.
By Chapin & Co.
Attorneys.

UNITED STATES PATENT OFFICE.

PATRICK T. SULLIVAN AND FRANKLIN JUDGE, OF GREENFIELD, MASSACHUSETTS, ASSIGNORS TO WELLS BROTHERS COMPANY, A CORPORATION OF MASSACHUSETTS.

PIPE THREADING AND REAMING DEVICE.

1,096,809.  Specification of Letters Patent.  Patented May 12, 1914.

Application filed December 26, 1913. Serial No. 808,670.

*To all whom it may concern:*

Be it known that we, PATRICK T. SULLIVAN and FRANKLIN JUDGE, both residing in the city of Greenfield, county of Franklin, and State of Massachusetts, have invented certain new and useful Improvements in Pipe Threading and Reaming Devices, of which the following is a specification.

Our invention relates to improvements in pipe threading and reaming devices and has for an object the provision of a pipe threading device combined with an internal guide and a reamer.

It is a well-known fact that in cutting pipe in the ordinary way, a bur is formed in the interior thereof and the diameter of the opening of the pipe is contracted thereby. It is desirable in pipe fitting work and particularly necessary in electrical conduit work to remove this bur and ream out the opening of the pipe to a diameter equal to that of the interior of the pipe. This we accomplish with our device simultaneously with the thread cutting operation.

We are aware that there are attachments to pipe threading devices which also ream the pipe as the threads are being cut but we are not aware that there exists any device which not only cuts the threads and reams the pipe but supports and alines the pipe by means of an internal cylindrical guide. We dispense entirely with the ordinary external guide and provide in its place a long cylindrical guiding member, of a diameter substantially equal to that of the interior of the pipe, and we form on the entering end of this guide a tapered fluted reamer. Thus the pipe is reamed to exactly the diameter of the pipe and no more. To ream the pipe to a larger diameter is unnecessary and may at times be positively detrimental.

The advantages of this construction are readily apparent. Short pieces of pipe projecting from a wall can be threaded squarely and accurately. Threads can be cut on short pieces, as for example nipples, and threads can be cut directly up to a shoulder. Furthermore, pipes which have not been cut off squarely but in an irregular or angular manner can be threaded as perfectly and as squarely as pipes which have been squarely cut. Moreover, the long, close fitting cylindrical guide provides a long accurate bearing and support for the work and insures that the threads on the pipe are cut true with the axis or bore of the pipe. Other advantages lie in the extreme simplicity of our device, the small number of parts, the durability of the same and the comparatively low cost of manufacture.

With these objects in view, the invention consists in the novel construction, arrangement and combination of parts to be hereinafter described and specifically claimed.

In the accompanying drawings which form a part of this specification: Figure 1 is a top plan view of our improved die stock and reamer. Fig. 2 is a sectional elevation thereof, taken on the broken line 2—2 of Fig. 1. Fig. 3 is a bottom plan view. Fig. 4 is a detail view of a short length of pipe which has been cut off at an angle to the axis thereof.

The die stock proper is designated by the reference letter $a$, and is provided with two internally threaded cylindrical projections $b$ for the reception of the usual pipe stock handles. The dies, or chasers, two in number, are represented by the letter $d$ and are of common construction. The upper portion of the die $d$ is provided with an inclined surface $d'$ which bears against a similar surface $a'$ formed in the die stock $a$, as clearly shown in Fig. 2, and the dies are held in place by a clamping member $c$ which is threaded into the die stock $a$ and bears against the lower surfaces of the dies $d$. These dies $d$ are laterally adjustable by set screws $e$ as shown in Fig. 2. The usual clearance spaces $l$ to provide or allow for the removal of chips are provided in the dies $d$ and the spaces $m$ in the die stock $a$. Similar passages $k$ communicating with passages $l$ and $m$ are provided in the clamping member $c$.

Referring now to the internal guide for the pipe, a long cylindrical piece $f$ is mounted centrally in the clamping member $c$, the reduced portion $g$ thereof being positioned between the four inwardly projecting portions $c'$ of the member $c$. A pointed set screw $h$ passes through one of these projections $c'$, and engages the portion $g$ of the cylindrical internal guide $f$, effectually preventing rotation of the guide $f$ relative to the member $c$. As shown in Fig. 2, the internal pipe $f$ has a bearing portion for entering the pipe, the length of which is several times the diameter thereof, and the diameter of the guide $f$ is practically that of the interior of the pipe. Thus, the pipe $n$, while a thread is being cut thereon, is supported and alined with die chasers $d$ in an accurate manner. The outermost or pipe entering portion of the guide $f$ is tapered and is formed with reaming or cutting teeth $f'$ to form a fluted tapered reamer.

The operation of the device is as follows: In cutting a thread on a pipe $n$ the point of the guide $f$ is inserted in the contracted opening of the pipe and, as the die stock is rotated and forced inwardly with a slight pressure, the teeth $f'$ cut away the bur, and ream the opening to a size nearly equal to that of the internal diameter of the pipe. After the pipe has been reamed the guide $f$ forms a support for the pipe $n$ and guides the work while it is being threaded, as shown in Fig. 2. Due to this long internal guide, short pieces of pipe can be perfectly threaded and threads can be cut directly up to a shoulder as has already been pointed out. Furthermore, pipe cut off in an irregular manner as for example such a piece as shown in Fig. 4 at $n'$ can also be threaded accurately as shown at $n^2$.

It is desirable in threading pipe to be able to gage the proper length of the threaded portion $n'$ of the pipe. If this portion $n'$ is not of sufficient length, the ends of two opposing pipes will not butt together when coupled. If the threaded portion $n'$ is too long, an unnecessary amount of turning results. To gage this length we provide a circular recess $i$ in the clamping member $c$ of a diameter slightly greater than the external diameter of the pipe and of such a depth that the combined depths of the recess $i$ and of the die $d$ is equal to the proper length of thread. Thus, as shown in Fig. 2, when the pipe has been threaded a sufficient length, the end of the pipe abuts against the surface $j$ of the recess $i$ and indicates to the operator that the pipe has been sufficiently threaded.

Thus we have provided a simple, cheap and durable die stock and reamer combined with a long cylindrical internal guide and a thread gaging stop.

It is to be understood that the invention is not dependent upon the depth of the recess $i$ to gage the length of the thread to be cut but it is advantageous to provide such a recess for the threaded end of the pipe to enter.

What we claim is:

1. The combination with a die stock and dies, of a clamping member for the dies, a cylindrical guide mounted centrally in said clamping member, the diameter of said guide being substantially equal to the internal diameter of the pipe to be threaded and the outermost portion of said guide being tapered and formed with cutting teeth, whereby the opening of the pipe is reamed to a diameter equal to the internal diameter of the pipe and the pipe stock is supported by said internal guide while the threads are being cut by said dies.

2. The combination with a die stock and dies, of a clamping member for the dies, an internal cylindrical guide mounted centrally in said clamping member, the diameter of said guide being substantially equal to the internal diameter of the pipe to be threaded and the pipe entering portion of said guide being tapered and provided with cutting teeth, to remove the bur prior to the formation of the threads, said clamping member being formed with a shoulder or stop, whereby, when the thread has been cut a proper distance on the pipe, the end thereof abuts said stop.

PATRICK T. SULLIVAN.
FRANKLIN JUDGE.

Witnesses:
CHARLES N. STODDARD,
JESSIE D. BLACKMER.